US011462773B2

(12) United States Patent
Oura et al.

(10) Patent No.: US 11,462,773 B2
(45) Date of Patent: Oct. 4, 2022

(54) SECONDARY BATTERY POSITIVE ELECTRODE AND SECONDARY BATTERY

(71) Applicant: Panasonic Intellectual Property Management Co., Ltd., Osaka (JP)

(72) Inventors: Yuji Oura, Osaka (JP); Tomoki Shiozaki, Osaka (JP); Hideharu Takezawa, Nara (JP); Takahito Nakayama, Osaka (JP); Takahiro Takahashi, Osaka (JP); Daisuke Furusawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 301 days.

(21) Appl. No.: 16/659,774

(22) Filed: Oct. 22, 2019

(65) Prior Publication Data
US 2020/0052348 A1 Feb. 13, 2020

Related U.S. Application Data

(63) Continuation of application No. PCT/JP2018/014871, filed on Apr. 9, 2018.

(30) Foreign Application Priority Data

Apr. 26, 2017 (JP) .............................. JP2017-087521

(51) Int. Cl.
*H01M 4/62* (2006.01)
*H01M 10/42* (2006.01)
(Continued)

(52) U.S. Cl.
CPC ......... *H01M 10/4235* (2013.01); *H01M 4/13* (2013.01); *H01M 4/366* (2013.01); *H01M 4/628* (2013.01); *H01M 2004/028* (2013.01)

(58) Field of Classification Search
None
See application file for complete search history.

(56) References Cited

U.S. PATENT DOCUMENTS

2004/0234850 A1* 11/2004 Watarai ............ H01M 10/0525
429/217
2013/0089781 A1* 4/2013 Miyazaki ............... H01G 11/28
429/211
(Continued)

FOREIGN PATENT DOCUMENTS

CN 1529917 A 9/2004
CN 102959768 A 3/2013
(Continued)

OTHER PUBLICATIONS

International Search Report dated Jul. 3, 2018, issued in counterpart Application No. PCT/JP2018/014871. (2 pages).
(Continued)

*Primary Examiner* — Yoshitoshi Takeuchi
(74) *Attorney, Agent, or Firm* — WHDA, LLP

(57) ABSTRACT

A secondary battery positive electrode is provided with: a positive electrode current collector; a positive electrode mixture layer; and an intermediate layer disposed between the positive electrode current collector and the positive electrode mixture layer. The intermediate layer comprises first particles configured from an electrically conductive material, and second particles which are configured from an insulating inorganic material and have an average grain size greater than an average grain size of the first particles. The volume ratio of the first particles in the intermediate layer is not less than 25% and less than 70%. The volume ratio of the second particles in the intermediate layer is not less than 30% and less than 75%. The density of the intermediate layer is greater than 1 g/cm$^3$ and not more than 2.5 g/cm$^3$.

5 Claims, 2 Drawing Sheets

(51) Int. Cl.
*H01M 4/13* (2010.01)
*H01M 4/36* (2006.01)
*H01M 4/02* (2006.01)

(56) References Cited

U.S. PATENT DOCUMENTS

| | | | | |
|---|---|---|---|---|
| 2013/0122359 | A1* | 5/2013 | Sato | H01M 4/13 |
| | | | | 429/188 |
| 2013/0224587 | A1* | 8/2013 | Uemura | H01M 4/663 |
| | | | | 429/211 |
| 2014/0099537 | A1* | 4/2014 | Kato | H01M 4/668 |
| | | | | 429/210 |
| 2015/0303484 | A1* | 10/2015 | Iida | H01M 4/664 |
| | | | | 429/233 |
| 2016/0093922 | A1 | 3/2016 | Endo et al. | |
| 2016/0190566 | A1 | 6/2016 | Shiozaki et al. | |

FOREIGN PATENT DOCUMENTS

| | | |
|---|---|---|
| JP | H09-147916 A | 6/1997 |
| JP | 5837884 B2 | 12/2015 |
| JP | 2016-072221 A | 5/2016 |
| JP | 2016-127000 A | 7/2016 |
| JP | 2017-059378 A | 3/2017 |
| NO | 2012/005301 A1 | 1/2012 |

OTHER PUBLICATIONS

English Translation of Search Report dated Feb. 24, 2022, issued in counterpart CN Application No. 201880025500.7. (3 pages).

* cited by examiner

SECONDARY BATTERY POSITIVE ELECTRODE AND SECONDARY BATTERY

TECHNICAL FIELD

The present invention relates to a secondary battery positive electrode and a technology of a secondary battery.

BACKGROUND ART

In recent years, as a secondary battery with high output and high energy density, a non-aqueous electrolyte secondary battery has been widely used, the battery comprising a positive electrode, a negative electrode, and a non-aqueous electrolyte wherein lithium ions are transferred between the positive electrode and the negative electrode for charge and discharge.

For example, Patent Literature 1 discloses a non-aqueous electrolyte secondary battery comprising a positive electrode, a negative electrode, and a non-aqueous electrolyte, wherein the above positive electrode comprises a positive electrode current collector, a positive electrode mixture layer formed on the current collector, and an intermediate layer formed between the positive electrode current collector and the positive electrode mixture layer, and the intermediate layer includes particles having a Vickers hardness of 5 GPa or more and mainly formed of a material having a thermal conductivity of 100 W/m·K or more and a specific resistance of $10^3$ Ω·m or more.

CITATION LIST

Patent Literature

PATENT LITERATURE 1: Japanese Unexamined Patent Application Publication No. 2016-127000
PATENT LITERATURE 2: Japanese Unexamined Patent Application Publication No. Hei 09-147916
PATENT LITERATURE 3: Japanese Patent Publication No. 5837884

SUMMARY

It is an important issue from the viewpoint of improving battery safety to suppress the amount of heat generated by the battery when the secondary battery is pierced by a conductive foreign matter such as a nail or a metal fragment to form an internal short circuit.

An object of the present disclosure is to provide a secondary battery positive electrode capable of suppressing the amount of heat generated by the battery when an internal short circuit occurs due to a conductive foreign matter, and a secondary battery comprising the positive electrode.

The secondary battery positive electrode according to one aspect of the present disclosure comprises a positive electrode current collector, a positive electrode mixture layer, and an intermediate layer provided between the above positive electrode current collector and the above positive electrode mixture layer. The above intermediate layer includes first particles formed of a conductive agent and second particles formed of an insulating inorganic material and having an average particle size larger than the average particle size of the above first particles. The secondary battery positive electrode is a secondary battery positive electrode in which the volume percentage of the above first particles in the above intermediate layer is 25% or more and less than 70%, the volume percentage of the above second particles in the above intermediate layer is 30% or more and less than 75%, and the density of the above intermediate layer is more than 1 g/cm$^3$ and 2.5 g/cm$^3$ or less.

The secondary battery according to one aspect of the present disclosure comprises a positive electrode, a negative electrode, and an electrolyte, and the above positive electrode is the secondary battery positive electrode described above.

According to one aspect of the present disclosure, it is possible to suppress the amount of heat generated by the battery when an internal short circuit occurs due to a conductive foreign matter.

DESCRIPTION OF EMBODIMENTS

Figure 1:
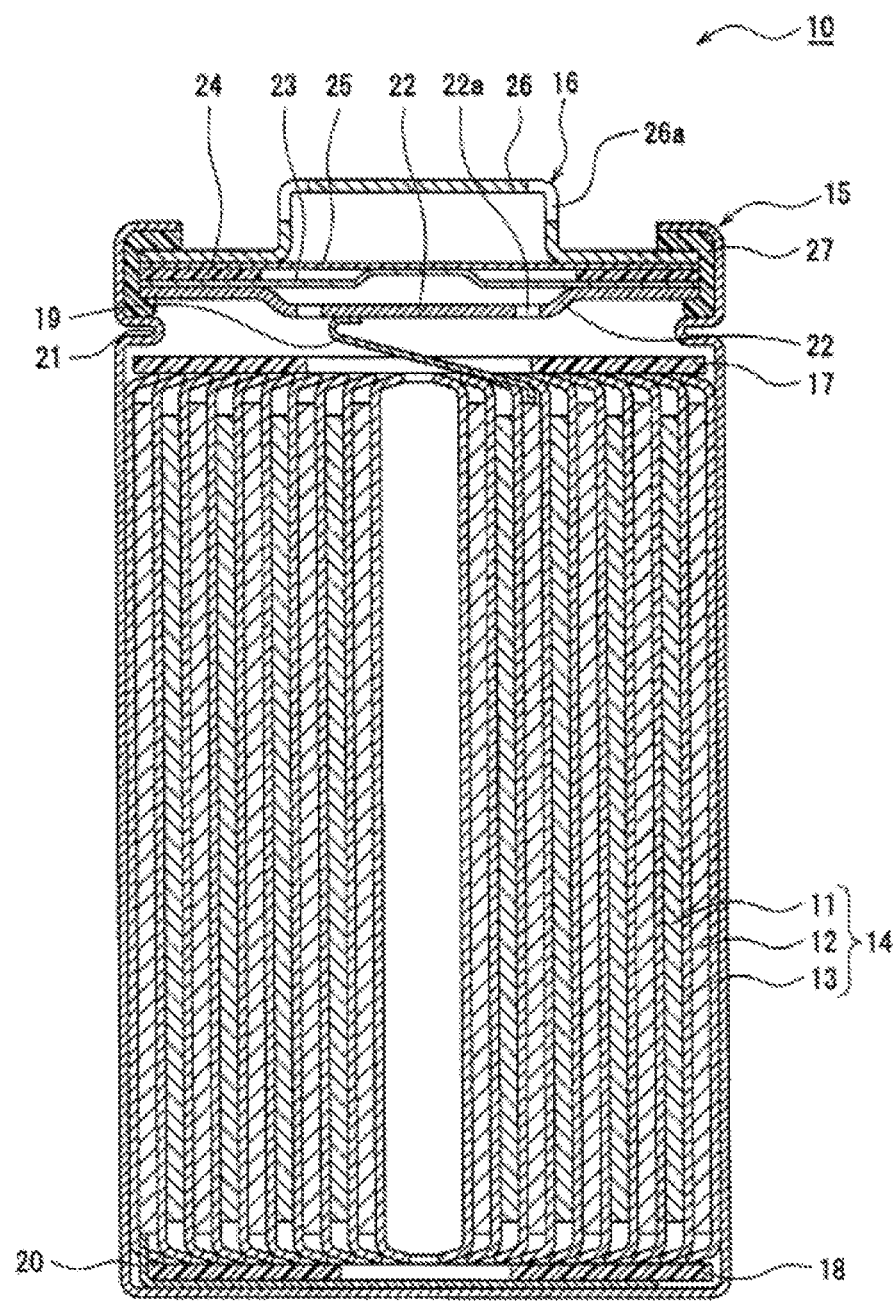
FIG. 1 is a sectional view of a secondary battery as an example of the embodiment.

The secondary battery positive electrode according to one aspect of the present disclosure comprises: a positive electrode current collector; a positive electrode mixture layer; and an intermediate layer provided between the above positive electrode current collector and the above positive electrode mixture layer, wherein the above intermediate layer includes: first particles formed of a conductive agent; and second particles formed of an insulating inorganic material and having an average particle size larger than the average particle size of the above first particles, and the volume percentage of the first particles in the above intermediate layer is 25% or more and less than 70%, the volume percentage of the second particles in the intermediate layer is 30% or more and less than 75%, and the density of the intermediate layer is more than 1 g/cm$^3$ and 2.5 g/cm$^3$ or less. Since the intermediate layer having such a configuration has a small internal void and a high heat capacity, it is assumed that the heat in the positive electrode tends to be absorbed and diffused into the intermediate layer when an internal short circuit occurs in the secondary battery. In addition, since the first particles and the second particles satisfying the above particle size ratio and volume percentage are used as the conductive agent and the insulating inorganic material, and the intermediate layer becomes a large resistance component when an internal short circuit occurs due to a conductive foreign matter, it is assumed that an increase in the short-circuit current between the positive and negative electrodes is suppressed. Thus, it is assumed that the amount of heat generated by the battery during internal short circuit is suppressed.

Hereinafter, an example of the embodiment will be described in detail. The drawings referred in the description of the embodiment are schematically described, and the dimensional ratio of the component drawn in the drawings may be different from the actual one.

FIG. 1 is a sectional view of a secondary battery as an example of the embodiment. The secondary battery 10 shown in FIG. 1 comprises: a wound type electrode assembly 14 obtained by winding a positive electrode 11 and a negative electrode 12 together with a separator 13 therebetween; an electrolyte; insulating plates 17 and 18 respectively disposed above and below the electrode assembly 14; and a battery case for housing the above members. The battery case is composed of a case main body 15 having a bottomed cylindrical shape and a sealing body 16. Instead of the wound type electrode assembly 14, another form of an electrode assembly may be applied, such as a stacked electrode assembly in which the positive electrode and the negative electrode are alternately stacked through the separator. Examples of the battery case include a metallic case such as a cylindrical shape, a square shape, a coin shape, or a button shape and a resin case (laminated battery) formed by laminating a resin sheet.

The case main body 15 is, for example, a metallic container with a bottomed cylindrical shape. A gasket 27 is provided between the case main body 15 and the sealing body 16 to ensure the sealability inside the battery case. The case main body 15 preferably has the projecting portion 21, which is formed, for example, by pressing the side surface portion from the outside, for supporting the sealing body 16. The projecting portion 21 is preferably formed in an annular shape along the circumferential direction of the case main body 15, and the sealing body 16 is supported on the upper surface thereof.

The sealing body 16 has a filter 22 in which a filter opening 22a is formed, and a valve body disposed on the filter 22. The valve body closes the filter opening 22a of the filter 22, and breaks when the internal pressure of the battery rises by heat generation due to an internal short circuit or the like. In the present embodiment, a lower valve body 23 and an upper valve body 25 are provided as valve bodies, and an insulating member 24 disposed between the lower valve body 23 and the upper valve body 25 and a cap 26 having a cap opening 26a are further provided. Each member constituting the sealing body 16 has a disk shape or a ring shape, for example, and each member except the insulating member 24 is electrically connected each other. Specifically, the filter 22 and the lower valve body 23 are joined together at their respective peripheral portions, and the upper valve body 25 and the cap 26 are also joined together at their respective peripheral portions. The lower valve body 23 and the upper valve body 25 are connected together at their respective central portions, and the insulating member 24 is interposed between the respective peripheral portions. When the internal pressure rises by heat generation due to an internal short circuit or the like, for example, the lower valve body 23 is broken at its thin portion, and thereby the upper valve body 25 bulges to the cap 26 side and leaves the lower valve body 23 to block both electrical connections.

In the secondary battery 10 shown in FIG. 1, a positive electrode lead 19 attached to the positive electrode 11 extends to the side of the sealing body 16 through the through hole of the insulating plate 17, and a negative electrode lead 20 attached to the negative electrode 12 extends to the bottom side of the case main body 15 through the outside of the insulating plate 18. For example, the positive electrode lead 19 is connected to the lower surface of the filter 22, which is a bottom plate of the sealing body 16, by welding or the like, and the cap 26, which is a top plate of the sealing body 16 electrically connected to the filter 22, serves as a positive electrode terminal. The negative electrode lead 20 is connected to the inner surface of bottom of the case main body 15, by welding or the like, and the case main body 15 serves as a negative electrode terminal.

[Positive Electrode]

Figure 2:
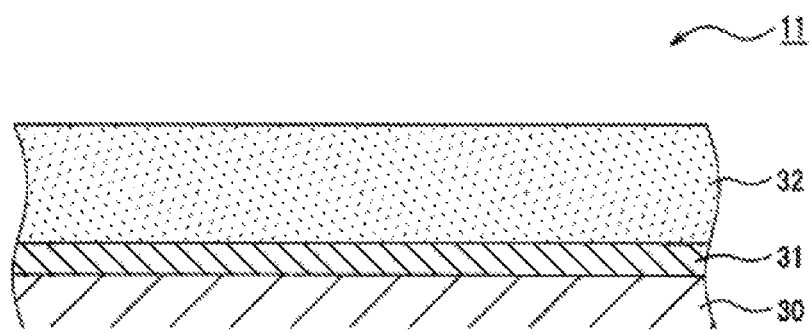
FIG. 2 is a sectional view of a positive electrode as an example of the embodiment.

FIG. 2 is a sectional view of a positive electrode as an example of the embodiment. The positive electrode 11 comprises a positive electrode current collector 30, a positive electrode mixture layer 32, and an intermediate layer 31 provided between the positive electrode current collector 30 and the positive electrode mixture layer 32.

As the positive electrode current collector 30, a foil of a metal stable in the potential range of the positive electrode such as aluminum or an aluminum alloy, a film in which the metal is disposed on an outer layer, or the like can be used. The positive electrode current collector 30 has, for example, a thickness of about 10 μm to 100 μm.

The positive electrode mixture layer 32 includes positive electrode active material. The positive electrode mixture layer 32 preferably includes a binder, from the viewpoints such that positive electrode active material can be bound each other to ensure the mechanical strength of the positive electrode mixture layer 32 and the bonding property between the positive electrode mixture layer 32 and the intermediate layer 31 can be enhanced. The positive electrode mixture layer 32 preferably includes a conductive agent from the viewpoint such that the conductivity of the layer can be improved.

Examples of positive electrode active material include lithium transition metal oxide containing transition metal elements such as Co, Mn, and Ni. Examples of lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M: at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$). These may be used singly or as a mixture of two or more. From the viewpoint of increasing the capacity of the secondary battery, positive electrode active material preferably include lithium nickel composite oxide such as $Li_xNiO_2$, $Li_xCo_yNi_{1-y}O_2$, and $Li_xNi_{1-y}M_yO_z$ (M: at least one of Na, Mg, Sc, Y, Mn, Fe, Co, Ni, Cu, Zn, Al, Cr, Pb, Sb, and B, $0<x\leq1.2$, $0<y\leq0.9$, and $2.0\leq z\leq2.3$).

Examples of the conductive agent include carbon particles such as carbon black (CB), acetylene black (AB), ketjen black, and graphite. These may be used singly or in combination of two or more.

Examples of the binder include fluorine resins such as polytetrafluoroethylene (PTFE) and polyvinylidene fluoride (PVdF), polyacrylonitrile (PAN), polyimide resins, acrylic resins, and polyolefin resins. These resins may be used in combination with carboxymethylcellulose (CMC) or a salt thereof (CMC-Na, CMC-K, CMC-$NH_4$, or the like, or a partially neutralized salt may be used), polyethylene oxide (PEO), and the like. These may be used singly or in combination of two or more.

The intermediate layer 31 includes the first particles formed of the conductive agent and the second particles formed of the insulating inorganic material and having an average particle size larger than the average particle size of the above first particles. The volume percentage of the first particles in the intermediate layer 31 is not particularly limited as long as it is 25% or more and less than 70%, and is more preferably 33% or more and 70% or less, and still more preferably 33% or more and 65% or less. The volume percentage of the second particles in the intermediate layer 31 is not particularly limited as long as it is 30% or more and less than 75%, and is more preferably 30% or more and 70% or less, and still more preferably 35% or more and 65% or less.

As described above, since use of the first particles and the second particles satisfying the above particle size ratio and volume percentage as the conductive agent and the insulating inorganic material, respectively, makes the intermediate layer 31 a larger resistance component when an internal short circuit occurs, an increase in the short-circuit current between the positive and negative electrodes is suppressed and thus the amount of heat generated by the battery is also suppressed. In the normal state of no internal short circuit, the conductive agent in the intermediate layer 31 ensures electrical conduction between the positive electrode mixture layer 32 and the positive electrode current collector 30.

Examples of the conductive agent includes the same kind of the conductive agent applied to the positive electrode mixture layer 32, for example, carbon particles such as carbon black (CB), acetylene black (AB), ketjen black, and graphite; conductive metal oxide particles such as antimony-doped tin oxide; metal particles such as aluminum and copper; and an inorganic filler coated with metal. These may be used singly or in combination of two or more. The conductive agent preferably includes carbon particles from the viewpoints such as the conductivity of the intermediate layer 31 and the manufacturing cost.

The insulating inorganic material is preferably, for example, an inorganic material having a resistivity of $10^{12}$ Ωcm or more, and examples thereof include metal oxide particles, metal nitride particles, metal fluoride particles, and insulating magnetic particles. Examples of the metal oxide particles include aluminum oxide, titanium oxide, zirconium oxide, silicon oxide, manganese oxide, magnesium oxide, and nickel oxide. Examples of the metal nitride particles include boron nitride, aluminum nitride, magnesium nitride, and silicon nitride. Examples of the metal fluoride particles include aluminum fluoride, lithium fluoride, sodium fluoride, magnesium fluoride, calcium fluoride, barium fluoride, aluminum hydroxide, and boehmite. Examples of the insulating magnetic particles include Ni—Cu—Zn ferrite. The insulating inorganic material preferably includes at least any one of aluminum oxide, titanium oxide, silicon oxide, and manganese oxide, and more preferably includes at least aluminum oxide, from the viewpoints such as an insulating property, a high melting point, and lower oxidizing power than a positive electrode active material. When an internal short circuit occurs, the redox reaction between the positive electrode active material and the positive electrode current collector 30 (especially the positive electrode current collector of aluminum or aluminum alloy) may generate heat, but the above redox reaction can be suppressed by using the insulating inorganic material having lower oxidizing power than the positive electrode active material, and thus the amount of heat generated by the battery can be suppressed.

The particle shapes of the first particles and the second particles are not particularly limited, and examples thereof include a rod shape. The rod shape includes, for example, those generally referred to as a plate shape, a needle shape, a scale shape, and a flake shape, and specifically, the particles have an aspect ratio of 10 or more (major axis length/minor axis length).

The aspect ratio is determined by the arithmetic mean of aspect ratios (values rounded off by a decimal point or less) determined from major axis and minor axis lengths of at least 20 or more particles (the first particles or second particles) measured by observation with a transmission electron microscope (TEM) or a scanning electron microscope (SEM). The major axis of a particle (the first particle or second particle) is a line segment that has the longest line segment across the particle in a two-dimensional image of the particle obtained by observation with a microscope (for example, a transmission electron microscope). The minor axis is a line segment that is orthogonal to the major axis and has the longest line segment across the particle.

The density of the intermediate layer 31 is not particularly limited as long as it is more than 1 $g/cm^3$ and 2.5 $g/cm^3$ or less, and is more preferably more than 1 $g/cm^3$ and 2.0 $g/cm^3$ or less, and still more preferably more than 1.5 $g/cm^3$ and 2.0 $g/cm^3$ or less. When the first particles are particles having an aspect ratio of less than 10 and the second particles are particles having an aspect ratio of 10 or more and 50 or less, preferably 10 or more and 30 or less, the density of the intermediate layer 31 is preferably 1.4 $g/cm^3$ or more and 2.5 $g/cm^3$ or less, more preferably 1.5 $g/cm^3$ or more and 2.0 $g/cm^3$ or less, and still more preferably 1.5 $g/cm^3$ or more and 1.8 $g/cm^3$ or less. When the first particles are particles having an aspect ratio of less than 10, the second particles are particles having an aspect ratio of 10 or more and 50 or less, preferably 10 or more and 30 or less, and the intermediate layer has a density of 1.4 $g/cm^3$ or more, the intermediate layer exhibits a higher heat capacity as compared with the case of the intermediate layer having a density of less than 1.4 $g/cm^3$ and can further suppress the amount of heat generated by the battery during internal short circuit. When the first particles are particles having an aspect ratio of less than 10, the second particles are particles having an aspect ratio of 10 or more and 50 or less, preferably 10 or more and 30 or less, and the intermediate layer has a density of 2.5 $g/cm^3$ or less, the flexibility of the electrode plate is improved as compared with the case of the intermediate layer having a density of more than 2.5 $g/cm^3$, and cracking of the electrode plate can be suppressed.

The density of the intermediate layer 31 can be adjusted by controlling: the volume percentage, particle size ratio, and aspect ratio of the first particles and second particles in the intermediate layer 31; press pressure when the intermediate layer 31 is rolled during positive electrode production; and dispersibility of particles included in the slurry for the intermediate layer.

The average particle size of the second particles is not particularly limited as long as it is larger than the average particle size of the first particles.

Preferably, the average particle size of the first particles is 0.01 μm or more and 2.0 μm or less and the average particle size of the second particles is 0.01 μm or more and 7.0 μm or less, and more preferably, the average particle size of the first particles is 0.03 μm or more and 0.05 μm or less and the average particle size of the second particles is 0.4 μm or more and 2.0 μm or less. When the average particle sizes of the first particles and the second particles satisfy the above range, the intermediate layer 31 can have a higher density and thus a lower amount of heat generated by the battery during internal short circuit as compared with the case out of the above range.

The average particle size is a volume average particle size measured by a laser diffraction method and means a median size at which the volume integrated value is 50% in the particle size distribution. The average particle sizes of the first particles and the second particles can be measured by using, for example, a laser diffraction/scattering particle size distribution measuring apparatus (manufactured by Horiba, Ltd.).

The intermediate layer 31 may include third particles having an average particle size different from that of the first particles and the second particles. For example, the intermediate layer 31 may include: the first particles formed of the conductive agent; the second particles formed of the insulating inorganic material; and the third particles having an average particle size larger (or smaller) than the first particles or the second particles and formed of the conductive agent. The volume percentage of the third particles in the intermediate layer 31 is not particularly limited as long as it is in a range which does not impair the effect in the present embodiment.

The intermediate layer 31 preferably includes a binder from the viewpoints such as improvement of mechanical strength and improvement of binding between the positive electrode mixture layer 32 and the positive electrode current collector 30. As the binder, a binder of the same type as applied to the positive electrode mixture layer 32 can be used, for example, fluorine resins such as polytetrafluoroethylene (PTFE) and polyvinylidene fluoride (PVdF), polyacrylonitrile (PAN), polyimide resin, acrylic resin, and polyolefin resin. These may be used singly or in combination of two or more. The content of the binder in the intermediate layer 31 is, for example, preferably 0.1 mass % to 5 mass %, and more preferably 1 mass % to 3 mass %.

The thickness of the intermediate layer 31 is, for example, preferably in the range of 0.5 µm or more and 10 µm or less, and more preferably 1.0 µm or more and 5.0 µm or less. If the thickness of the intermediate layer 31 is less than 0.5 µm, the heat capacity of the intermediate layer 31 may decrease and the amount of heat generated by the battery due to an internal short circuit may increase as compared with the case where the above range is satisfied. If the thickness of the intermediate layer 31 exceeds 10 µm, the resistance between the positive electrode mixture layer 32 and the positive electrode current collector 30 may increase in the normal state of no internal short circuit and thus the output characteristics of the battery may deteriorate, as compared with the case where the above range is satisfied.

An example of a method for producing the positive electrode 11 will be described. On the positive electrode current collector 30, the slurry for intermediate layer including the conductive agent as the first particles, the insulating inorganic material as the second particles, and the like is applied and dried to form the intermediate layer 31, and the intermediate layer 31 is rolled. Then, on the intermediate layer 31, a positive electrode mixture slurry including a positive electrode active material and the like is applied and dried to form the positive electrode mixture layer 32, and the positive electrode mixture layer 32 is rolled. The positive electrode 11 can be obtained as described above. When insulating magnetic particles as the insulating inorganic material are used, the slurry for the intermediate layer is applied and then a magnetic field is applied to orient the major axis of the insulating magnetic particles in a predetermined direction (for example, the surface direction of the positive electrode current collector), and then may be dried.

[Negative Electrode]

The negative electrode 12 comprises, for example, the negative electrode current collector, such as the metal foil, and the negative electrode mixture layer formed on the negative electrode current collector. As the negative electrode current collector, a foil of a metal stable in the potential range of the negative electrode such as copper, the film in which the metal is disposed on an outer layer, or the like can be used. The negative electrode mixture layer includes the negative electrode active material, the binder, and the thickener.

The negative electrode 12 is obtained, for example, by applying and drying the negative electrode mixture slurry including the negative electrode active material, the thickener, and the binder on the negative electrode current collector to form the negative electrode mixture layer on the negative electrode current collector and by rolling the negative electrode mixture layer. The negative electrode mixture layer may be provided on the both surfaces of the negative electrode current collector.

The negative electrode active material is not particularly limited as long as it is a material capable of absorbing and desorbing lithium ions, and examples thereof include lithium alloys such as a metallic lithium, a lithium-aluminum alloy, a lithium-lead alloy, a lithium-silicon alloy, and a lithium-tin alloy; carbon materials such as graphite, coke, and an organic sintered body; and metal oxides such as $SnO_2$, SnO, and $TiO_2$. These may be used singly or in combination of two or more.

As the binder included in the negative electrode mixture layer, a fluorine resin, PAN, a polyimide resin, an acrylic resin, a polyolefin resin, or the like can be used as in the case of the positive electrode. When the negative electrode mixture slurry is prepared by using an aqueous solvent, styrene-butadiene rubber (SBR), CMC or a salt thereof, polyacrylic acid (PAA) or a salt thereof (which is PAA-Na, PAA-K, or the like, or may be partially neutralized salt), polyvinyl alcohol (PVA), or the like is preferably used.

[Separator]

An ion-permeable and insulating porous sheet or the like is used as the separator 13. Specific examples of the porous sheet include a microporous thin film, a woven fabric, and a nonwoven fabric. Suitable examples of the material for the separator include olefin resins such as polyethylene and polypropylene, and cellulose. The separator 13 may be a laminate having a cellulose fiber layer and a layer of fibers of a thermoplastic resin such as an olefin resin. The separator 13 may also be a multi-layered separator including a polyethylene layer and a polypropylene layer, and a separator coated with a material such as an aramid resin or a ceramic on the surface thereof may be used.

[Electrolyte]

The electrolyte includes a solvent and an electrolyte salt dissolved in the solvent. The electrolyte is not limited to a liquid electrolyte (non-aqueous electrolyte solution), and may be a solid electrolyte using a gel-like polymer or the like. As a solvent, a non-aqueous solvent such as an ester, an ether, a nitrile such as acetonitrile, an amide such as dimethylformamide, or a mixed solvent of two or more of these, or water can be used. The non-aqueous solvent may contain a halogen substituted product in which at least some hydrogens of any of these solvents are replaced by a halogen atom such as fluorine.

Examples of the above esters include cyclic carbonate esters such as ethylene carbonate (EC), propylene carbonate (PC), and butylene carbonate; chain carbonate esters such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylic acid esters such as γ-butyrolactone and γ-valerolactone; and chain carboxylic acid esters such as methyl acetate, ethyl acetate, propyl acetate, methyl propionate (MP), ethyl propionate, and γ-butyrolactone.

Examples of the above ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methyl furan, 1,8-cineole, and crown ether; and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxy toluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl.

As the above halogen substituted product, fluorinated cyclic carbonate esters such as fluoroethylene carbonate (FEC); fluorinated chain carbonate esters; fluorinated chain carboxylic acid esters such as methyl fluoropropionate (FMP); or the like are preferably used.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (1<x<6, n is 1 or 2), $LiB_{10}Cl_{10}$, LiCl, LiBr, LiI, chloroborane lithium, lower aliphatic carboxylic acid lithium, $Li_2B_4O_7$, borates such as $Li(B(C_2O_4)F_2)$, and imide salts such as $LiN(SO_2CF_3)_2$, $LiN(ClF_{2l+1}SO_2)(C_mF_{2m+1}SO_2)$ (l and m are an integer of 1 or more). For the lithium salt, these may be used singly or a mixture of various lithium salts may be used. Among them, $LiPF_6$ is preferably used from the viewpoints such as ion conductivity and electrochemical stability. The concentration of the lithium salt is preferably 0.8 to 1.8 mol per liter of a solvent.

EXAMPLES

Hereinafter, the present disclosure will be described in more detail with reference to Examples, but the present disclosure is not limited to the following Examples.

Example 1

[Production of Positive Electrode]

Plate-like aluminum oxide ($Al_2O_3$) having an average particle size of 0.6 μm and an aspect ratio of 10, granular acetylene black (AB) having an average particle size of 0.04 μm and an aspect ratio of 1, and polyvinylidene fluoride (PVDF) were mixed at a volume ratio of 65.6:33.7:0.7, and an appropriate amount of N-methyl-2-pyrrolidone (NMP) was added to prepare a slurry for the intermediate layer. The slurry was applied on both surfaces of the positive electrode current collector consisting of aluminum foil with a thickness of 15 μm, and the resulting coating was dried to form an intermediate layer with a thickness of 3.5 μm. The average particle size of acetylene black:the average particle size of aluminum oxide in Example 6 was 1:15, and the density of the intermediate layer was 1.8 g/cm³.

As the positive electrode active material, a lithium nickel composite oxide represented by $LiNi_{0.82}Co_{0.15}Al_{0.03}O_2$ was used. 97 parts by mass of the positive electrode active material, 1.5 parts by mass of acetylene black (AB), and 1.5 parts by mass of polyvinylidene fluoride (PVDF) were mixed, and then an appropriate amount of N-methyl-2-pyrrolidone (NMP) was added to prepare a positive electrode mixture slurry. This positive electrode mixture slurry was applied on the intermediate layer formed on both surfaces of the positive electrode current collector. The resulting coating was dried and rolled using a pressure roller to produce a positive electrode consisting of the positive electrode current collector, the intermediate layer formed on both surfaces of the positive electrode current collector, and the positive electrode mixture layer formed on the intermediate layer.

[Production of Negative Electrode]

100 parts by mass of artificial graphite, 1 part by mass of carboxymethylcellulose (CMC), and 1 part by mass of styrene-butadiene rubber (SBR) were mixed to prepare a negative electrode mixture slurry. Then, the negative electrode mixture slurry was applied to both surfaces of the negative electrode current collector consisting of copper foil. The resulting coating was dried and then rolled using a pressure roller to produce a negative electrode in which a negative electrode mixture layer was formed on both surfaces of the positive electrode current collector.

[Preparation of Electrolyte]

Ethylene carbonate (EC), methyl ethyl carbonate (EMC), and dimethyl carbonate (DMC) were mixed in a volume ratio of 3:3:4. $LiPF_6$ was dissolved in the mixed solvent so as to obtain a concentration of 1.2 mol/L to prepare a non-aqueous electrolyte.

[Production of Secondary Battery]

Each of the above positive electrode and the negative electrode was cut into a predetermined size, attached with an electrode tab, and wound through the separator to produce a wound type electrode assembly. Then, the electrode assembly was housed in a cylindrical outer can, and the above non-aqueous electrolyte was injected and sealed. This was the non-aqueous electrolyte secondary battery in Example 1.

Example 2

In preparation of the slurry for the intermediate layer, a positive electrode was produced in the same manner as in Example 1, except that plate-like aluminum oxide ($Al_2O_3$) having an average particle size of 2 μm and an aspect ratio of 25, the above acetylene black (AB), and polyvinylidene fluoride (PVDF) were mixed in a volume ratio of 36.5:63.0:0.5. The average particle size of acetylene black:the average particle size of aluminum oxide in Example 2 was 1:50, and the density of the intermediate layer was 1.5 g/cm³. Using this as the positive electrode in Example 2, a non-aqueous electrolyte secondary battery was produced in the same manner as in Example 1.

Example 3

In preparation of the slurry for the intermediate layer, a positive electrode was produced in the same manner as in Example 1, except that plate-like aluminum oxide ($Al_2O_3$) having an average particle size of 2 μm and an aspect ratio of 50, the above acetylene black (AB), and polyvinylidene fluoride (PVDF) were mixed in a volume ratio of 36.5:63.0:0.6. The average particle size of acetylene black:the average particle size of aluminum oxide in Example 3 was 1:50, and the density of the intermediate layer was 1.5 g/cm³. Using this as the positive electrode in Example 3, a non-aqueous electrolyte secondary battery was produced in the same manner as in Example 1.

Example 4

In preparation of the slurry for the intermediate layer, a positive electrode was produced in the same manner as in Example 1, except that plate-like aluminum oxide ($Al_2O_3$) having an average particle size of 2 μm and an aspect ratio of 50, the above acetylene black (AB), and polyvinylidene fluoride (PVDF) were mixed in a volume ratio of 30.2:69.5:0.4. The average particle size of acetylene black:the average particle size of aluminum oxide in Example 4 was 1:50, and the density of the intermediate layer was 1.3 g/cm³. Using this as the positive electrode in Example 4, a non-aqueous electrolyte secondary battery was produced in the same manner as in Example 1.

Comparative Example

In preparation of the slurry for the intermediate layer, a positive electrode was produced in the same manner as in Example 1, except that aluminum oxide ($Al_2O_3$) having an average particle size of 0.7 μm and an aspect ratio of 1, the above acetylene black (AB), and polyvinylidene fluoride (PVDF) were mixed in a volume ratio of 74.8:24.6:0.5. The average particle size of acetylene black:the average particle size of aluminum oxide in Comparative Example was 1:17.5, and the density of the intermediate layer was 1.0 g/cm³. Using this as the positive electrode in Comparative Example, a non-aqueous electrolyte secondary battery was produced in the same manner as in Example 1.

[Nailing Test]

For the non-aqueous electrolyte secondary battery of each of Examples and Comparative Example, the nailing test was performed in the following procedure.

(1) Charging was performed until the battery voltage reached 4.2 V at a constant current of 600 mA under an environment of 25° C., and then charging was continued until the current value reached 90 mA at a constant voltage.

(2) Under an environment of 25° C., the tip of a round nail having a 2.7 mmφ diameter was contact with the center portion in the side surface of the battery charged in (1), the round nail pierced thereto in the stacking direction of the electrode assembly in the battery at a rate of 1 mm/s, and the round nail was stopped to pierce immediately after a battery voltage drop due to an internal short circuit was detected.

(3) The amount of heat generation (J) was calculated as V×I×t, where V is the voltage and I is the current measured after t seconds between start and stop of the short circuit of the battery induced by the round nail.

Table 1 shows the composition of the intermediate layer of the positive electrode used in each of Examples and Comparative Example, and the results of the nailing test.

intermediate layer is improved and the amount of heat generated by the battery during internal short circuit can be suppressed.

Among Examples 1 to 4 in which the first particles were granular and the second particles were particles having an aspect ratio of 10 or more and 50 or less, the amount of heat generated by the battery during internal short circuit could be further suppressed in Examples 1 to 3 in which the density of the intermediate layer was 1.4 g/cm³ or more and 2.5 g/cm³ or less. This is probably because the intermediate layer functioned as a larger resistance component when an internal short circuit occurred. Furthermore, the amount of heat generated by the battery during internal short circuit could be further suppressed in Examples 1 and 2 in which the first particles were granular and the second particles were particles having an aspect ratio of 10 or more and 30 or less.

REFERENCE SIGNS LIST

10 Secondary battery
11 Positive electrode
12 Negative electrode
13 Separator
14 Electrode assembly
15 Case main body
16 Sealing body
17, 18 Insulating plate
19 Positive electrode lead
20 Negative electrode lead
21 Projecting portion
22 Filter
22a Opening of filter
23 Lower valve body
24 Insulating member
25 Upper valve body
26 Cap
26a Opening of cap
27 Gasket
30 Positive electrode current collector
31 Intermediate layer
32 Positive electrode mixture layer

TABLE 1

|  | Intermediate layer | | | | Amount of heat generated by the battery during internal short circuit (J) |
| --- | --- | --- | --- | --- | --- |
|  | Average particle size (μm) AB:$Al_2O_3$ | Particle size ratio AB:$Al_2O_3$ | Composition ratio (% by volume) $Al_2O_3$:AB:PVDF | Density (g/cm³) |  |
| Comparative Example 1 | 0.04:0.7 | 1:17.5 | 74.8:24.6:0.5 | 1.0 | 8.9 |
| Example 1 | 0.04:0.6 | 1:15 | 65.6:33.7:0.7 | 1.8 | 0.3 |
| Example 2 | 0.04:2 | 1:50 | 36.5:63.0:0.5 | 1.5 | 0.3 |
| Example 3 | 0.04:2 | 1:50 | 36.5:63.0:0.6 | 1.5 | 1.2 |
| Example 4 | 0.04:2 | 1:50 | 30.2:69.5:0.4 | 1.3 | 5.0 |

The non-aqueous electrolyte secondary battery in each of Examples showed a lower value of heat generated by the battery in the nailing test, as compared with the non-aqueous electrolyte secondary battery in Comparative Example. Therefore, using the positive electrode for the non-aqueous electrolyte secondary battery, comprising: the positive electrode current collector; the positive electrode mixture layer; and the intermediate layer provided between the positive electrode current collector and the positive electrode mixture layer, wherein the intermediate layer includes: the first particles formed of the conductive agent; and the second particles formed of the insulating inorganic material and having an average particle size larger than the average particle size of the first particles, and the volume percentage of the first particles in the intermediate layer is 25% or more and less than 70%, and the volume percentage of the second particles in the intermediate layer is 30% or more and less than 75%, and the density of the intermediate layer is more than 1 g/cm³ and 2.5 g/cm³ or less, the heat capacity of the

The invention claimed is:

1. A secondary battery positive electrode, comprising:
a positive electrode current collector;
a positive electrode mixture layer; and
an intermediate layer provided between the positive electrode current collector and the positive electrode mixture layer, wherein
the intermediate layer comprises:
first particles formed of a conductive agent;

second particles formed of an insulating inorganic material and having an average particle size larger than an average particle size of the first particles; and a binder in a concentration of from 0.1 mass % to 5 mass %, wherein a volume percentage of the first particles in the intermediate layer is 25% or more and less than 70% and a volume percentage of the second particles in the intermediate layer is 30% or more and less than 75%; and a density of the intermediate layer is more than 1 g/cm$^3$ and 2.5 g/cm$^3$ or less.

2. The secondary battery positive electrode according to claim 1, wherein the first particles are particles having an aspect ratio of less than 10 and the second particles are particles having an aspect ratio of 10 or more and 50 or less, and the density of the intermediate layer is 1.4 g/cm$^3$ or more and 2.5 g/cm$^3$ or less.

3. The secondary battery positive electrode according to claim 2, wherein the second particles are particles having an aspect ratio of 10 or more and 30 or less.

4. The secondary battery positive electrode according to claim 1, wherein the average particle size of the first particles is 0.03 μm or more and 0.05 μm or less and the average particle size of the second particles is 0.4 μm or more and 2.0 μm or less.

5. A secondary battery, comprising:
a positive electrode;
a negative electrode; and
an electrolyte, wherein
the positive electrode is the secondary battery positive electrode according to claim 1.

* * * * *